3,168,441
             BLUE ANTHRAQUINONE DYE
Milos Zdenek Bil, Flushing, N.Y., and Walter H. Brunner,
  Easton, Pa., assignors, by mesne assignments, to Clairol
  Incorporated, New York, N.Y., a corporation of
  Delaware
     No Drawing. Filed July 31, 1961, Ser. No. 127,885
                 8 Claims. (Cl. 167—88)

This invention relates to the preparation of novel blue anthraquinone dyes. More particularly this invention relates to the preparation of novel anthraquinone dyes which are derivatives of 1-amino-4-bromo-2-anthraquinonesulfonic acid ("bromamine acid"), dyeing compositions and methods for dyeing keratinaceous material and particularly human hair by the use of the novel dye.

It is known that bromamine acid yields numerous blue to violet dyes when condensed with cyclic amines. Illustrative of such dyes are: Alizarine Saphirol A (condensation product with aniline); and Alizarine Brilliant Pure Blue R (condensation product with cyclohexylamine). The above two dyes and a number of others which are condensation products of bromamine acid and a cyclic amine can be found in H. A. Lubs, The Chemistry of Synthetic Dyes and Pigments, Reinhold Publishing Corp. (1955), particularly on page 415 thereof.

Very little is known or published about dyes prepared from bromamine acid and aliphatic amines. Swiss Patent No. 249,871 describes an acid anthraquinone dye which is prepared by condensing 1-amino-4-bromo-2,8-anthraquinonedisulfonic acid with heptylamine. This heptylamine derivative dyes wool, silk and synthetic nitrogen containing fibers a blue color, which becomes an intense reddish-blue on addition of paraformaldehyde. German Patent No. 453,769 describes condensation products of bromamine acid with simple aliphatic amines such as butylamine. United States Patent No. 1,735,147, which appears to correspond with the above mentioned German patent, describes in more detail the alkylamines to be used, i.e., in col. I, lines 26–31, "the term alkyl designates a radical in which the carbon atom attached to the amino nitrogen is a link in an open chain of carbon atoms, the methyl and methylene radicals being considered the lowest members in the series of open carbon chains." Examples of specific alkyls mentioned in that U.S. patent are: methyl, ethyl, propyl, butyl, and benzyl.

In addition to the above described cyclic amine or aliphatic amine derivatives of bromamine acid there have been recently synthesized by the inventors herein derivatives of bromamine acid with: monoethanolamine; diethanolamine; triethanolamine; ethylenediamine; propylenediamine; N-methyl-ethylenediamine,

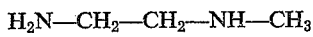

aminoethylethanolamine,

diethylenetriamine,

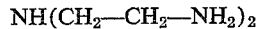

tetraethylenepentamine,

and dipropylenetriamine,

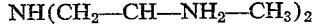

Although many of the hereinabove mentioned prior art dyes or those recently synthesized by the inventors herein (including alkali metal salts and salts considered equivalent to those formed with the alkali metals of the prior art and recently synthesized dyes) possess unusually good dyeing properties, they suffer from poor affinity and poor stability when applied to human hair; also, many of the aliphatic amine derivatives of bromamine acid including those of diethylenetriamine and dipropylenetriamine which are fairly closely related to the dyes of this invention suffer from additional shortcomings in their tinctorial strength or purity of shade.

It has now been found that alkali metal salts of the condensation product of bromamine acid and imino-bis-propylamine of the formula

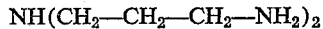

are dyes having unusually good properties such as purity of shade, high tinctorial strength and are particularly distinguished in their affinity and stability to human hair.

The novel blue anthraquinone dyes of this invention can be represented by the following generic formula:

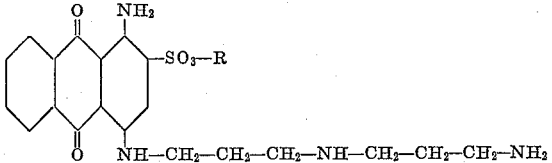

wherein R represents an alkali metal such as sodium or potassium.

The novel anthraquinone dyes can be produced by the conventional methods employed in the reaction of bromamine acid with a cyclic or aliphatic amine. Such methods are described in the hereinabove mentioned text of H. A. Lubs, particularly pages 412–414 and U.S. Patent 1,735,147. Illustratively they can be produced by heating the sodium salt of 1-amino-4-bromo-2-anthraquinonesulfonic acid and imino-bis-propylamine dissolved or dispersed in water in the presence of a copper catalyst and on completion of this reaction salting out with an alkali metal salt such as potassium chloride. The precipitated dye can be subsequently isolated by conventional techniques. Alternatively, instead of precipitating the alkali metal salt, the imino-bis-propylamine derivative of bromamine acid can be recovered in the free acid form by addition of a strong acid such as sulfuric to the reaction mixture which can subsequently be converted to the alkali metal salt by conventional techniques of neutralization. A preferred method for producing the novel anthraquinone dyes of this invention is by heating at a temperature such as that of about 70° C. to about 200° C. and particularly at a temperature of about 100° C. to 103° C. an aqueous solution or dispersion containing an alkali metal salt of bromamine acid and particularly the sodium salt thereof and imino-bis-propylamine wherein the solution or dispersion contains a molar excess of the imino-bis-propylamine such as that of from about 3.5 to about 12 moles of the imino-bis-propylamine per mole of the alkali metal salt of bromamine acid and particularly about 3.5 moles of the imino compound per mole of the sodium salt of bromamine acid. In this preferred method the reaction time can vary over a broad range such as from about 30 minutes to about 2 hours and particularly about 1 hour. Copper sulfate is the preferred catalyst.

The novel anthraquinone compounds of this invention are distinguished structurally from the prior art bromamine acid derivatives since they contain an aliphatic polyamine, namely triamine, instead of the simple monoamine. Furthermore, the carbon atom chain of this triamine is interrupted by a secondary amine linkage in the middle of the chain. Such triamines have several reactive groups, and therefore, several reaction products could have been expected in their reaction with bromamine acid. A surprising feature of this invention is that only one such reaction product is formed as can be ascertained by paper chromatography and whereby good reproducibility and uniformity of shade can easily be achieved.

Although the novel anthraquinone compounds of this invention are produced by the conventional methods for condensing an amine with bromamine acid, it was unexpected that this reaction would take place by substitution of the bromine atom only since the aliphatic triamine reactant of this invention shows a markedly greater basicity in aqueous medium than a simple aliphatic amine. It is therefore quite unusual that this triamine reacts predominantly and selectively with only the bromine atom whereas the quite labile sulfo-group in the molecule is not affected.

In dyeing with the novel anthraquinone dyes of this invention, the dyeing composition can comprise an aqueous alkaline solution of the dye which can be applied to keratinaceous material such as wool, furs, feathers, bristles and particularly human hair. In addition to the water and anthraquinone dye, the dyeing compositions can also contain the conventional ingredients of such compositions such as additional dyes, alkalizing agents, organic solvents, thickeners, detergents, gums, and the like. The compositions can be applied to keratinaceous materials by the conventional techniques used in the art. Illustratively, when applied to living hair on the human head, they can be applied to the hair with a brush, sponge, or other means of contact, such as dipping until the hair is properly saturated. The reaction time or time of contact of the dyeing composition with the keratinaceous material is not critical and can vary over the wide range used in the dyeing art such as periods of about 5 minutes to about 2 hours and preferably from about 15 minutes to 60 minutes when used for dyeing human hair. The dyeing temperature can vary over wide limits as is conventional in the art. Thus, the dyeing temperatures for use with humans can vary from about room temperature, e.g., about 20° C. to above 60° C. and preferably from about 20° C. to 45° C.

The dyeing compositions can be prepared by the conventional methods used in the dyeing art. Thus, they can be prepared by dissolving or dispersing the dye in water of the desired concentration. Water miscible organic solvents can be employed to facilitate solution of the dye; in this event, the dye can be dissolved first in the solvent and then diluted with water. Illustrative of the organic solvents which can be used, there can be mentioned: alkyl monohydric alcohols such as those having from 1 to 6 carbon atoms, e.g., ethanol, isopropanol, etc.; alkyl dihydric alcohols such as those having from 2 to 6 carbon atoms, e.g., propyleneglycol; and various polyhydric alcohols, ketones or esters. The dispersion of the various ingredients can also be facilitated by addition of a detergent or dispersing agent such as lauryl or myristyl sulfate or sulfonate.

Any water-soluble alkalizing agent that will not interfere (i.e., is compatible) with the dye employed and will not precipitate the dye or introduce any possibility of toxicity under the conditions of use, or injure the scalp or hide of the pelt, at its ultimate concentration in the composition to be applied to the keratinaceous material can be used. A preliminary test of some selected alkalizing agent can be made to note its compatibilty with the dye or to introduce possibility of toxicity or injury.

Ammonium hydroxide, because of its freedom from toxicity over a wide concentration range and its economy is an acceptable alkalizing agent. However, there can be used in place of or together with the ammonia any other compatible ammonia derivative alkalizing agent such as a lower alkanolamine such as mono-, di-, or triethanolamine, or a heterocyclic amine as morpholine, or a lower alkyl mono- or diamine such as monomethylamine, dimethylamine, monoethylamine, or diethylamine or amines such as tetraethylenepentamine, propylenediamine, dipropylenetriamine, etc. Any of these ammonia derivative alkalizing agents as well as ammonium hydroxide may be broadly referred to as "ammonium alkalizant."

Also, as alkalizing agent, any alkaline earth hydroxide, for example calcium hydroxide or magnesium hydroxide can be used up to the limit of its water-solubility and at any concentration that fails to produce a precipitate with any of the components of the composition. The dissolved alkaline earth hydroxide is preferred over the alkali metal hydroxides, such as sodium hydroxide, or potassium hydroxide or carbonates such as sodium carbonate and bicarbonate, and of which can also be used so long as its ultimate concentration in the final dyeing solution is below that which might possibly irritate the scalp, or injure the hide of the fur pelt.

The quantity of the various ingredients in the dyeing compositions of this invention can vary over a wide range. The anthraquinone colorants of this invention can be employed in the conventional concentrations used in the dyeing of the various kertinaceous materials. Illustratively, tinctorially effective quantities of the anthraquinone dyes can vary from less than about .01% to greater than about 10% by weight of the aqueous solution. In the dyeing of living human hair the concentration of dye will preferably vary from about 0.05% to about 5% by weight of the aqueous solution and particularly from about 0.1% to about 3%. When desired any selected compatible alkalizing agent should be used to give a pH greater than 7, such as about 7.5 to about 12 and preferably from about 8 to 11. The quantity of the alkalizing agent employed can vary over a wide range depending on the particular alkalizing agent employed. Thus, the alkalizing agent can vary from about 0.1% to about 5% and preferably from about 0.5% to about 2% by weight of the aqueous solution. The water content of the composition is ordinarily the major constituent and can vary over a wide range dependent in large measure on the quantity of other additives.

The anthraquinone dyes employed in this invention are water dispersible in the usual generic sense as embracing true solutions of the dyes in water or any aqueous medium within the bounds of the invention as well as stable homogeneous colloidal solutions of them in such aqueous medium. Thus, the aqueous medium includes the aqueous alkaline medium. It includes also any aqueous medium containing for example a sufficient amount of a compound, e.g., ethanol, employed as a common solvent to enhance the solution of the dye or some other organic material. The compositions can be formulated as solutions, gels, emulsions, dispersions, and the like.

The following examples are illustrative of this invention:

*Example I*

The sodium salt of bromamine acid (40.5 g.) and imino-bis-propylamine (46.9 g.) were added to 250 ml. of water in which there was previously dissolved copper sulfate (0.5 g.). This mixture was then refluxed at 100° C. to 103° C. for two hours. The intense blue solution which formed during the reaction was then diluted with its double volume of water and salted out with potassium chloride. After stirring for several hours the product, potassium-1-amino-4-(aminopropylaminopropyl)amino-2-anthraquinonesulfonate corresponding to the following formula:

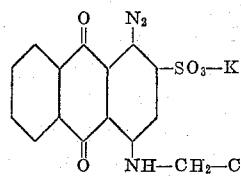

was filtered off and dried to a blue crystalline substance, soluble in water and dilute alkaline solutions with a deep blue color. Approximately 51 g. of the dry dyestuff resulted. Acidification of the product of this example produced the free acid form of the compound. The free acid form which is brown in color can also be produced by following the process of this example but precipitating the free acid out by acidifying the reaction mixture, e.g., with sulfuric acid, instead of salting out with a material such as potassium chloride. The novel anthraquinone of this invention which is in the free acid form can be converted to the alkali metal salt by neutralization and thus is an intermediate in preparing the novel dyes.

*Example II*

The following dyeing composition was prepared:

Ingredient: Percent by weight of entire composition
(a) Potassium-1-amino-4-(aminopropylamino-propyl)amino-2-anthraquinonesulfonate ____ 0.25
(b) Sodium dodecyl benzene sulfonate _____ 1.20
(c) Triethanolamine _____ percent__ 0.50
(d) Water _____ Q.S.

The dyeing composition of Example II was prepared by producing an aqueous solution of the above ingredients. The composition was then poured on human heads having grey hair and permitted to remain thereon at a temperature of about 32° C. for 25 minutes before the hair was rinsed with water and subsequnetly dried. A pure blue shade was imparted to the grey hair.

It is to be understood that the foregoing examples are intended only to illustrate the invention, and in no sense to limit the invention to the specific reactants, reaction conditions, manipulative techniques, or final dyeing compositions employed therein. The invention can be practiced broadly within the description thereof set forth hereinabove, and it is to be understood that any modifications or equivalents, e.g., the use of a basic element or radical such as the ammonium radical in place of the alkali metals in the generic formula of the novel anthraquinone dyes, that would occur to one skilled in the art are to be considered as lying within the scope of this invention.

What is claimed is:
1. Anthraquinone dyes of the following formula:

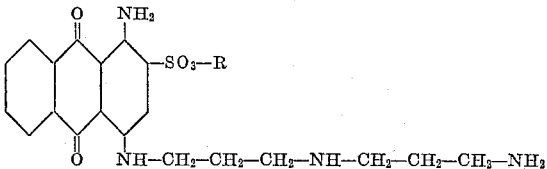

wherein R is an alkali metal.
2. An anthraquinone dye of the formula:

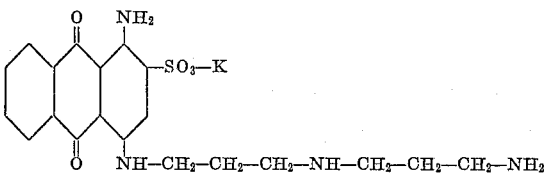

3. An anthraquinone of the formula:

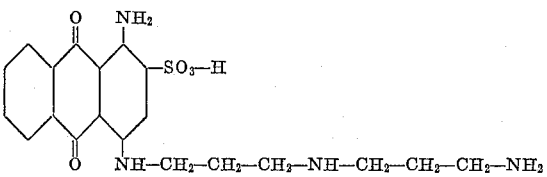

4. A process for dyeing keratinaceous material which comprises applying thereto a tinctorially effective quantity of an aqueous solution containing an anthraquinone which is represented by the following formula:

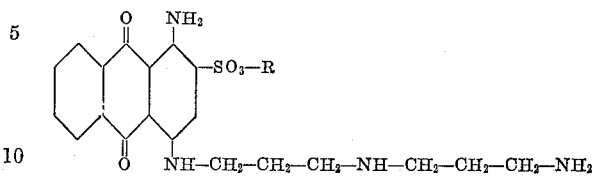

wherein R is an alkali metal.
5. A process for dyeing human hair which comprises applying thereto a tinctorially effective quantity of an aqueous solution containing an anthraquinone which is represented by the following formula:

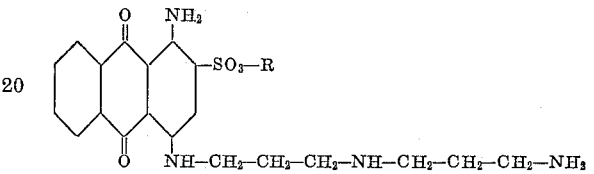

wherein R is an alkali metal.
6. A hair dyeing composition comprising an aqueous solution containing from about 0.05% to about 5% of an anthraquinone which is represented by the following formula:

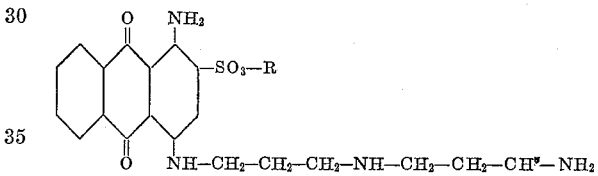

wherein R is an alkali metal and a sufficient quantity of an alkalizing agent to impart a pH of about 7.5 to about 12 to the said aqueous solution.
7. The hair dyeing composition of claim 6 wherein R represents potassium.
8. A process for dyeing living human hair which comprises applying thereto an aqueous solution containing from about 0.05% to about 5% of an anthraquinone which is represented by the following formula:

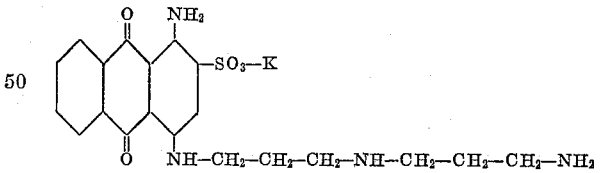

and a sufficient quantity of an ammonium alkalizant to impart a pH of about 8 to about 11 to the said aqueous solution.

References Cited in the file of this patent

UNITED STATES PATENTS

| | | |
|---|---|---|
| 2,875,769 | Rosmarin et al. | Mar. 3, 1959 |
| 2,983,651 | Seemuller | May 9, 1961 |
| 3,041,244 | Feit et al. | June 26, 1962 |

OTHER REFERENCES

Colour Index, Second Edition, The American Association of Textile Chemists and Colorists, Lowell, Massachusetts (1957) (pages 3055, 3500–2 relied on).